Dec. 9, 1930.  C. BERG  1,783,995
MOTOR VEHICLE
Filed Dec. 19, 1925   2 Sheets-Sheet 1
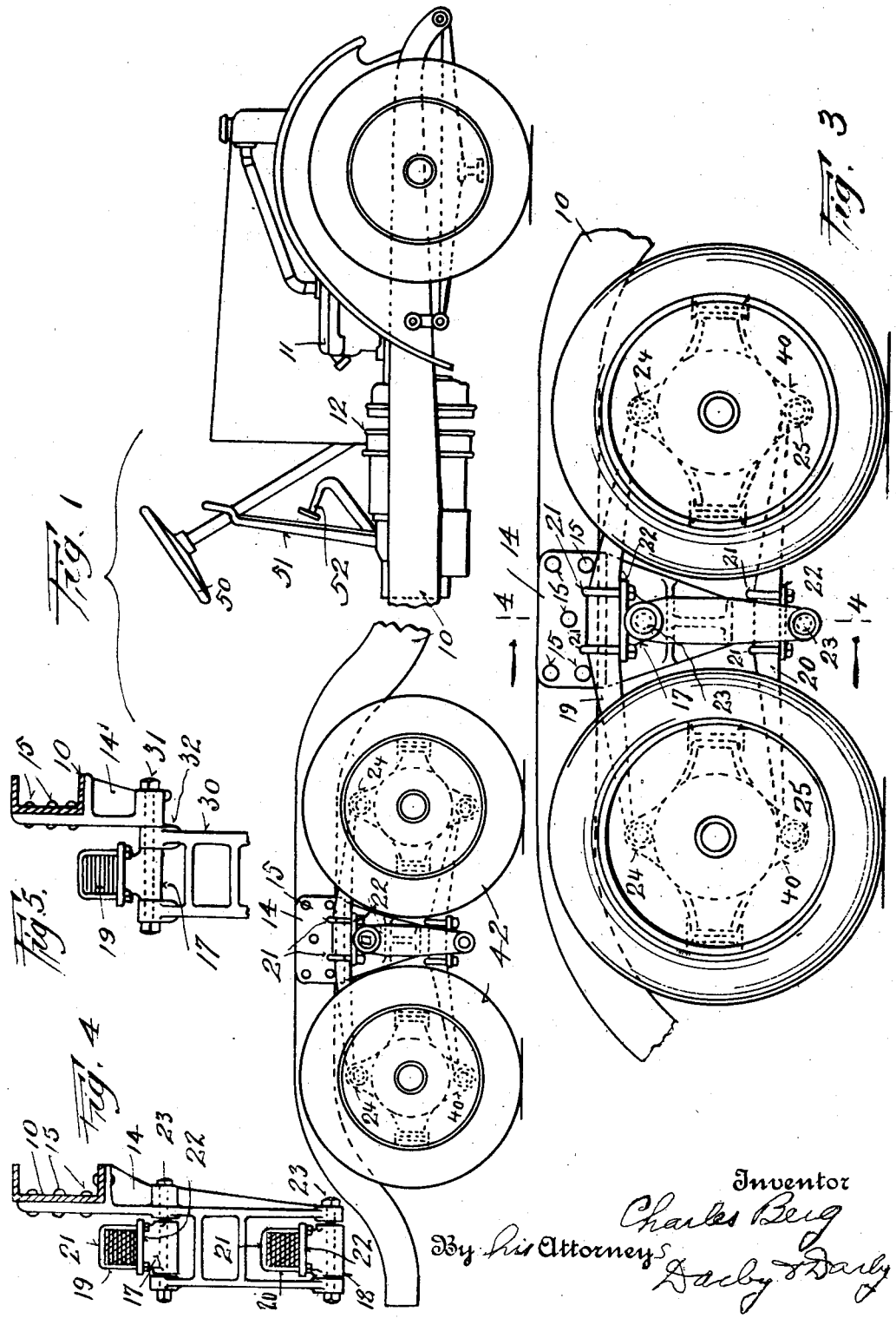

Dec. 9, 1930.  C. BERG  1,783,995
MOTOR VEHICLE
Filed Dec. 19, 1925  2 Sheets-Sheet 2
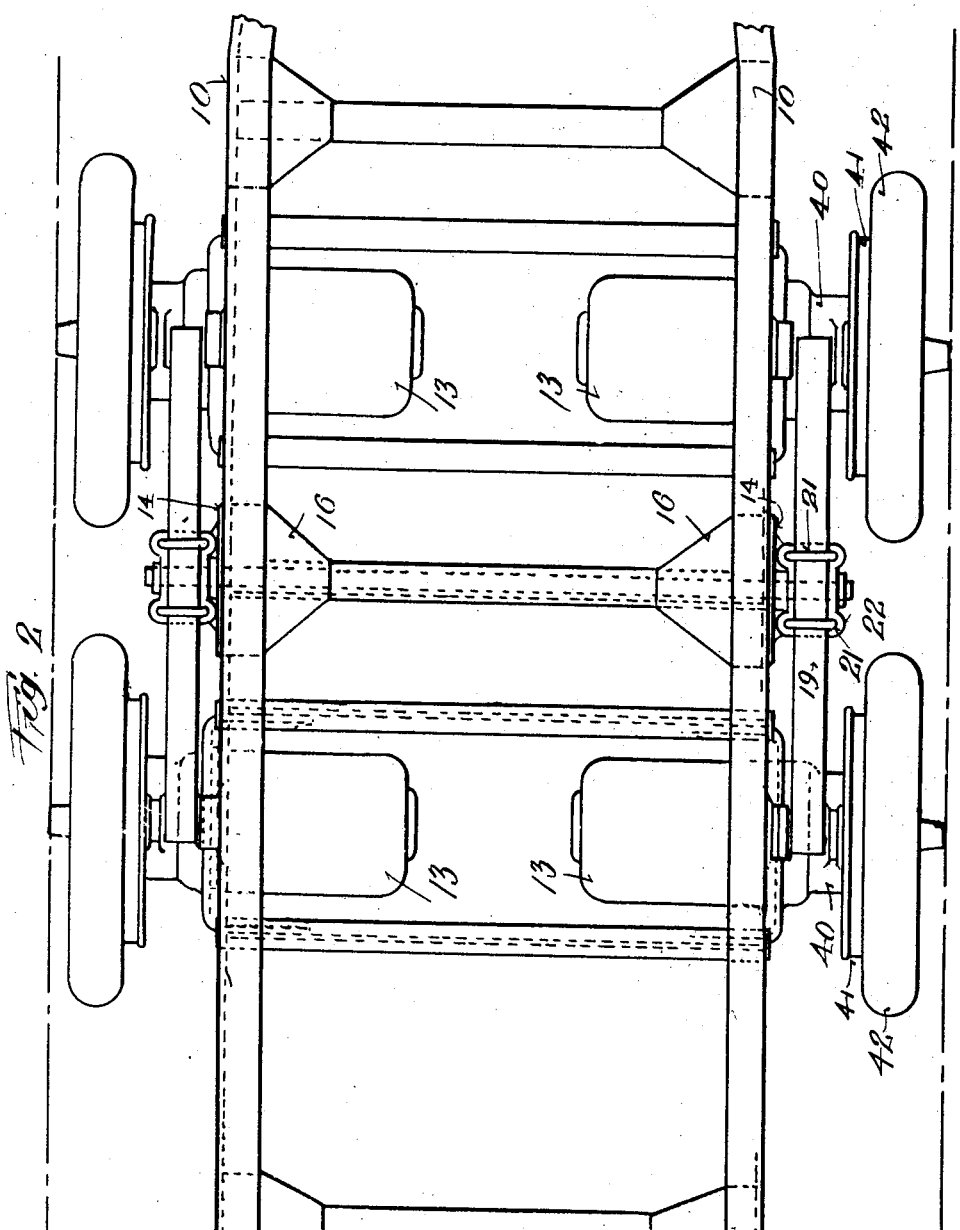

Patented Dec. 9, 1930

1,783,995

UNITED STATES PATENT OFFICE

CHARLES BERG, OF NEW YORK, N. Y.

MOTOR VEHICLE

Application filed December 19, 1925. Serial No. 76,365.

This invention relates to an improved gas-electric motor vehicle having four-wheel, four-motor direct drive with double spring suspension for the motors and drive.

The object of my invention includes the provision of flexibly supported multiple motor and multiple drive for six wheel chassis constructions. Another object includes the provision of a motor construction with double spring support for facilitating the starting of the vehicle thus equipped, and by which construction the starting torque and brake reactions are practically overcome and rendered ineffective. By means of my construction a greater degree of flexibility is obtained, as well as better co-ordination between the tire and road surfaces, thus materially reducing and practically eliminating the scrubbing effect between the said tire and road surfaces.

Another object of my invention provides for the elimination of differential drives and its attending difficulties. I also provide for better load distribution and greater traction surface. By my direct motor-drive construction each wheel is in effect an independent power unit directly applied to the wheel without waste of energy due to mechanical constructions for the transmission of power and hence my direct motor drive affords greater efficiency as well as a greater degree of flexibility. My four-wheel, four-motor drive construction provides an independent and positive motive power for each drive wheel affording therefore means for rapid and efficient acceleration which is a very important factor in bus construction where stops are of necessity frequent and more or less irregular. My construction whereby the power equipment is divided into a plurality of units thus provides also a greater radiating surface for the dissipation of heat, and a less distance from the center of the motors to the outside surface than with a single or even a two-motor equipment of the same total capacity. The motors will accordingly run cooler and give a greater over-load capacity with consequent less deterioration of insulation.

Other objects will appear hereinafter, and I attain these objects by the construction illustrated in the accompanying drawings in which Fig. 1 is a side elevation of a motor vehicle construction which is made in accordance with the principles of my invention.

Fig. 2 represents a plan view thereof.

Fig. 3 is an enlarged view showing the spring suspension for the motors and drive.

Fig. 4 is a view taken on the line 4—4 of Fig. 3 and

Fig. 5 shows a modified form of spring support.

Like numerals refer to the same parts throughout the several views.

Referring now to the drawings, the chassis, or frame, 10, is provided at its front end with the usual gas-power plant 11, which operates an attached electric generator 12, and at or near its rear end I provide supporting means for the spring suspended motors 13, and attached parts.

The gas-power plant and its connected electric generator, for generating the current required by the motors, are of known construction, and it is therefore not necessary to here describe said constructions in detail. For convenience these combined units will be hereinafter designated as the gas-electric power unit or plant.

At the proper position at or near the rear portion of frame 10, 10. I attach the spring supporting members or brackets 14, 14 by suitable means as rivets 15. These brackets may be provided with reinforcing webs 16, and with spring supporting seats 17 and 18 for receiving springs 19 and 20. In a preferred form of construction the spring holding brackets 14 are rigid members and the springs 19 and 20 are each secured to its seat by clevis links 21 secured to holding or seating plates 22. The seats are pivotally mounted in the bracket 14 on pivot pins 23. In another type of spring holding bracket shown in Fig. 5, for example, the bracket member 14' has a jointed extension 30, which is held in position by a bolt 31 on the knuckle 32. Bolt 31 also supports the spring seat 17 for spring 19 and the bracket 30 holds the spring 20 and its seat 18 as in the rigid type of bracket. This form of construction provides for greater freedom in the relative up and down movements of the spring ends as will be readily understood.

The spring members 19 and 20 carry at their respective ends 24 and 25 the gear case 40 with the electric motor 13 attached thereto on one side, and the brake drum 41 and wheel 42 on the other. This construction permits a certain amount of flexibility and freedom of substantially up and down or oscillatory movements of the wheels as they meet obstructions, or as they pass over uneven road surfaces, thereby deriving the above enumerated and other advantages in the operation of vehicles thus equipped. It will be also noted that, with the greater amount of traction surface, acceleration will be quicker, and when the motors are run in parallel there is a direct driving power applied to each of the drive wheels. There is consequently no loss of power or wasted energy dissipated on account of slippage and the pulling power of the individual wheels remains unaffected. There is moreover obviously also greater freedom of radial action for turning corners.

It is understood that the vehicle thus equipped with my gas-electric power plant may be guided by the usual steering wheel 50 and the gas unit 11 is controlled in the usual manner (not herein shown). An emergency lever 51 and brake pedal 52 afford the usual means for stopping.

Having now described my invention, what I claim as new and useful, of my own invention, and desire to receive by Letters Patent, is:

1. In a motor vehicle, the combination of a pair of drive wheels mounted in tandem and having electric power units mounted on each of said wheels and carried thereby, a vehicle frame having brackets extending therefrom, an extension on each of said brackets and pivot plates on said extension, a pair of spring members mounted on said plates to independently oscillate in a common plane, the opposite ends of each pair of spring members engaging a power unit to flexibly suspend the same to oscillate about a common point on said bracket, said power units mounted at the end of springs and supported at one side independently of electric power units at the other side of the vehicle frame.

2. In a motor vehicle the combination of a pair of drive wheels mounted in tandem and having electric power units mounted on each of said wheels and carried thereby, a vehicle frame, and bracket members on said frame, said bracket members each having an extension, spring seating members mounted on said extensions, a clamping yoke on each of said seating members whereby a pair of spring members are held in parallel relation, the opposite ends of each pair of spring members engaging a power unit to flexibly suspend the same to oscillate about a common point, said power units mounted at the end of springs and supported at one side independently of electric power units at the other side of the vehicle frame.

3. A spring suspension including a supporting frame, a spring member pivoted thereon for movement in a vertical plane, dual axles pivotally connected at the free ends of said spring and free for transverse movement toward and from each other incident to expansion of said spring, and a connection pivotally mounted beneath the spring pivot and pivotally connected at its outer ends to the bearing boxes for said axles at a point removed from the spring pivot.

4. A spring suspension including a supporting frame, a spring member pivoted thereon for movement in a vertical plane, dual axles pivotally connected at the free ends of said spring and free for transverse movement toward and from each other incident to expansion of said spring, and a supplemental spring pivoted in the vertical plane of the pivot of the first mentioned spring and having its outer ends pivotally connected to said axles at a point below the pivotal connection of the first mentioned spring.

5. A spring suspension including a frame, a supporting spring pivotally connected with the frame for movement in a vertical plane, parallel axles provided with bearing boxes having pivoting posts at the upper and lower faces thereof, a pivotal connection between the upper post and said spring, and a connecting member pivoted in alignment with said spring and having a pivotal connection with the lower post of the bearing box.

In testimony whereof I have hereunto set my hand on this fifteenth day of October, A. D. 1925.

CHARLES BERG.